(12) United States Patent
Iizumi et al.

(10) Patent No.: US 7,568,273 B2
(45) Date of Patent: *Aug. 4, 2009

(54) SURFACE ROUGHENING METHOD

(75) Inventors: Masahiko Iizumi, Kanagawa (JP);
Kimio Nishimura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 96 days.

This patent is subject to a terminal disclaimer.

(21) Appl. No.: 10/572,724

(22) PCT Filed: Dec. 9, 2005

(86) PCT No.: PCT/IB2005/003724

§ 371 (c)(1),
(2), (4) Date: Mar. 21, 2006

(87) PCT Pub. No.: WO2006/061710

PCT Pub. Date: Jun. 15, 2006

(65) Prior Publication Data

US 2008/0245227 A1    Oct. 9, 2008

(30) Foreign Application Priority Data

Dec. 10, 2004    (JP) .............................. 2004-358718

(51) Int. Cl.
*B23P 25/00*    (2006.01)
*B23P 13/00*    (2006.01)
(52) U.S. Cl. ...................... 29/458; 29/557; 29/888.061
(58) Field of Classification Search .................. 29/458, 29/557, 888.061, 527.2; 470/198; 72/71, 72/112
See application file for complete search history.

(56) References Cited

U.S. PATENT DOCUMENTS 5,080,056 A * 1/1992 Kramer et al. ........... 123/193.4

(Continued)

FOREIGN PATENT DOCUMENTS

DE    101 47 219    4/2003

(Continued)

OTHER PUBLICATIONS

Notification of Transmittal of the International Search Report and the Written Opinion of the International Searching Authority, dated Mar. 10, 2006, for corresponding International Application PCT/IB2005/003724, 11 pages.

*Primary Examiner*—Jermie E Cozart
(74) *Attorney, Agent, or Firm*—Global IP Counselors, LLP

(57) ABSTRACT

The disclosure relates to surface roughening methods in which a cutting tool having a radial cutting blade with first and second cutting edges is fed along a longitudinal axis of an article while rotating the cutting tool about the axis. The first cutting edge forms a first machined pattern of peaks and valleys on a surface of the article, and the second cutting edge removes at least a portion of the peaks to form roughened fracture surfaces in a second machined pattern defining an arrangement of grooves, corresponding to the valleys, separated by lands, corresponding to the roughened fracture surfaces. The first and second walls may include concave regions within the grooves. The disclosure also provides cutting tools useful in practicing the methods, and cylindrical articles having interior or exterior surfaces roughened using the methods. The methods may have applications to fabrication of cylinder blocks for internal combustion engines.

16 Claims, 13 Drawing Sheets

U.S. PATENT DOCUMENTS

| | | | | |
|---|---|---|---|---|
| 5,363,821 | A | * 11/1994 | Rao et al. | 123/193.2 |
| 5,671,532 | A | * 9/1997 | Rao et al. | 29/888.061 |
| 2003/0010201 | A1 | 1/2003 | Takahashi et al. | |
| 2008/0245226 | A1* | 10/2008 | Iizumi et al. | 92/169.1 |

FOREIGN PATENT DOCUMENTS

| | | |
|---|---|---|
| JP | 2002-155350 | 5/2002 |
| JP | 2003-328108 | 11/2003 |
| JP | 2006-159388 | 6/2006 |

* cited by examiner

SURFACE ROUGHENING METHOD

This application is a National Stage filing under 35 USC 371 of International Application No. PCT/IB2005/003724, filed Dec. 9, 2005, which claims priority to Japanese Patent Application No. 2004-358718, filed Dec. 10, 2004, the entire contents of each of which is incorporated herein by reference.

TECHNICAL FIELD

The invention relates to methods of surface roughening and cutting tools useful in surface roughening, as well as articles having roughened surfaces, particularly articles useful in manufacturing internal combustion engines for motor vehicle applications.

BACKGROUND

Internal combustion engines are increasingly fabricated using lightweight metals such as aluminum to decrease weight and achieve greater fuel efficiency. In particular, aluminum cylinder blocks have recently been fabricated with the internal surfaces of the cylinder bores spray coated with a material which acts to lubricate the cylinder bore and which aids the disposal of the engine's exhaust gases, for example, by catalyzing chemical reactions associated with the combustion process.

When the inner surface of a cylinder bore of a liner-less aluminum cylinder block is spray-coated, it is generally necessary to roughen the inner surface of the cylinder bore beforehand to enhance the adhesion of the spray coating. Surface roughening may be achieved, for example, using bead blasting, high pressure water jet blasting, or mechanical machining methods. However, these methods may not lead to a uniformly roughened surface, which can lead to adhesion failure of the coating to the cylinder wall. In addition, conventional machining methods can be time intensive and expensive, often requiring multiple pass machining steps to produce a cylinder bore surface having sufficient roughness to adhere the thermally sprayed coating.

Thus, a more reproducible and cost effective surface roughening method has been sought. The art continually searches for new methods of surface roughening, particularly roughening of cylindrical metal surfaces useful in fabricating internal combustion engines.

SUMMARY

In general, the disclosure relates to methods of surface roughening, cutting tools useful in practicing the surface roughening methods, and articles having surfaces roughened using the methods. More particularly, the disclosure relates to mechanical surface roughening methods useful for metal surfaces, more specifically, cylindrical metal surfaces. The surface roughening methods, cutting tools and articles, may be useful in manufacturing internal combustion engines for motor vehicle applications.

In one embodiment, a method comprises forming a pattern of peaks and valleys on a surface of an article in a longitudinal axial direction with the leading edge of a rotary cutting head having a leading edge and a trailing edge, applying a stress to the peaks with the trailing edge of the cutting head, and fracturing the peaks to create a fracture surface defining lands separating the valleys defining grooves. In some embodiments, the first and second walls comprise concave regions within the grooves. In exemplary embodiments, each groove is asymmetrical. In some embodiments, each groove comprises a notch.

In some embodiments, each of the valleys has a leading edge wall extending from a groove in a direction corresponding to a radial line drawn normal to the surface of the article. In certain embodiments, a first line drawn along a first wall of the grooves in the second pattern form an acute angle with a second line drawn along a second wall of the grooves in the second pattern, and a bisector of the acute angle lies above a line drawn normal to the surface of the article.

In certain additional embodiments, the method includes applying a coating to the roughened surface. In some embodiments, the coating is applied using at least one of chemical vapor deposition, plasma deposition, thermal spray coating, and fluid spray coating. The coating may include an abrasion resistant material. In some embodiments, the coating includes a ceramic material or a metal.

In another embodiment, a surface roughening system comprises means for roughening a surface of an article, wherein the means for roughening further comprises a radial leading edge means for cutting a first pattern of peaks and valleys into the surface, and a trailing edge means for fracturing the peaks. In some embodiments, the system comprises means for feeding the means for roughening along a longitudinal axis of the article comprising the surface. In certain other embodiments, the system comprises means for rotating the means for roughening about the longitudinal axis of the article, wherein rotating the means for roughening while moving the means for roughening relative to the surface creates a second pattern comprising a plurality of lands created by fracturing the peaks of the first pattern, with each land separated by grooves corresponding to the valleys in the first pattern. In some embodiments, the first and second walls comprise concave regions within the grooves. In exemplary embodiments, each groove is asymmetrical. In some embodiments, each groove comprises a notch.

In certain additional embodiments, a first line drawn along a first wall of the grooves in the second pattern and a second line drawn along a second wall of the grooves in the second pattern form an acute angle, and a bisector of the acute angle lies above a line drawn normal to the surface of the article.

In another embodiment, a cutting tool comprises a rotary cutting head further comprising a cutting blade. In some embodiments, the cutting blade comprises a planar surface, wherein the planar surface intersects with a rake surface to form a leading cutting edge. In exemplary embodiments, the leading cutting edge is shaped to cut a first pattern of peaks and valleys into a surface of an article, wherein the valleys comprise a first wall and a second wall. In exemplary embodiments, the first and second walls further comprise concave regions.

In further embodiments, a first line drawn along the first wall and a second line drawn along the second wall form an acute angle, and a bisector of the acute angle lies above a line drawn normal to the surface. In additional embodiments, the planar surface slopes upward from the leading cutting edge to a trailing edge of the cutting blade, and the trailing edge forms a fracture surface by applying a stress to the peaks of the first pattern and forming a second pattern. The second pattern comprises lands at the fracture surfaces separated by grooves, wherein the grooves in the second pattern correspond to the valleys in the first pattern. In some embodiments, concave regions in the first pattern correspond to notches in the grooves of the second pattern In additional embodiments, the leading cutting edge of the cutting tool further comprises a second cutting edge, and the second cutting edge comprises a substantially triangular cross section that cuts concave regions in the valleys of the first pattern, the concave regions corresponding to a notch in the second wall of the grooves in the second pattern. In some embodiments, the second cutting edge is above the planar surface on the leading edge of the cutting blade. In other embodiments, the planar surface slopes downward at an obtuse angle with respect to a plane of a body of the cutting head. In still other embodiments, the line drawn along the first wall overlies the line drawn normal to the surface of the article. In certain embodiments, the line drawn along the first wall is above the line drawn normal to the surface of the article. In yet other embodiments, the line drawn along the first wall is below the line drawn normal to the surface of the article.

In certain exemplary embodiments, the cutting tool further comprises an end face along the first planar surface, wherein the end face comprises a roughening pattern of protrusions and depressions, and wherein the roughening pattern further roughens the lands of the second pattern after the trailing edge of the cutting blade removes the peaks of the first pattern.

In other exemplary embodiments, the cutting head comprises at least one of a metal, a ceramic, or diamond. In some embodiments, the cutting blade includes at least one metal selected from titanium, tungsten, cobalt, nickel, iron, and aluminum. In other embodiments, the cutting blade includes at least one ceramic material comprises one or more of silicon nitride, silicon carbide, aluminum oxide, silicon dioxide, and titanium nitride.

In yet another embodiment, a cylindrical body comprises a machine roughened surface including a substantially helical pattern of grooves separated by substantially uniform roughened surface regions defining lands, wherein the cross section of the grooves is substantially asymmetrical, and wherein each groove further comprises a first wall and a second wall. In some embodiments, the first and second walls comprise concave regions within the grooves. In exemplary embodiments, each groove is asymmetrical. In some embodiments, each groove comprises a notch.

In some embodiments, a first line drawn along a first wall of each groove in a first direction forms an acute angle with a second line drawn along a second wall of each groove in a second direction, and a bisector of the acute angle lies above a line drawn normal to the surface of the cylindrical body.

In certain embodiments, the roughened surface is an interior surface of the cylindrical body. In some embodiments, the cylindrical body may be formed from a nonferrous metal. In additional embodiments, a coating is applied to the surface overlaying the lands and grooves. In certain exemplary embodiments, the machine roughened surface comprises an inner surface of a cylindrical bore in a cylinder block of an internal combustion engine. In other exemplary embodiments, the machine roughened surface comprises an outer surface of a cylindrical liner inserted within a cylinder bore of a cylinder block of an internal combustion engine.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
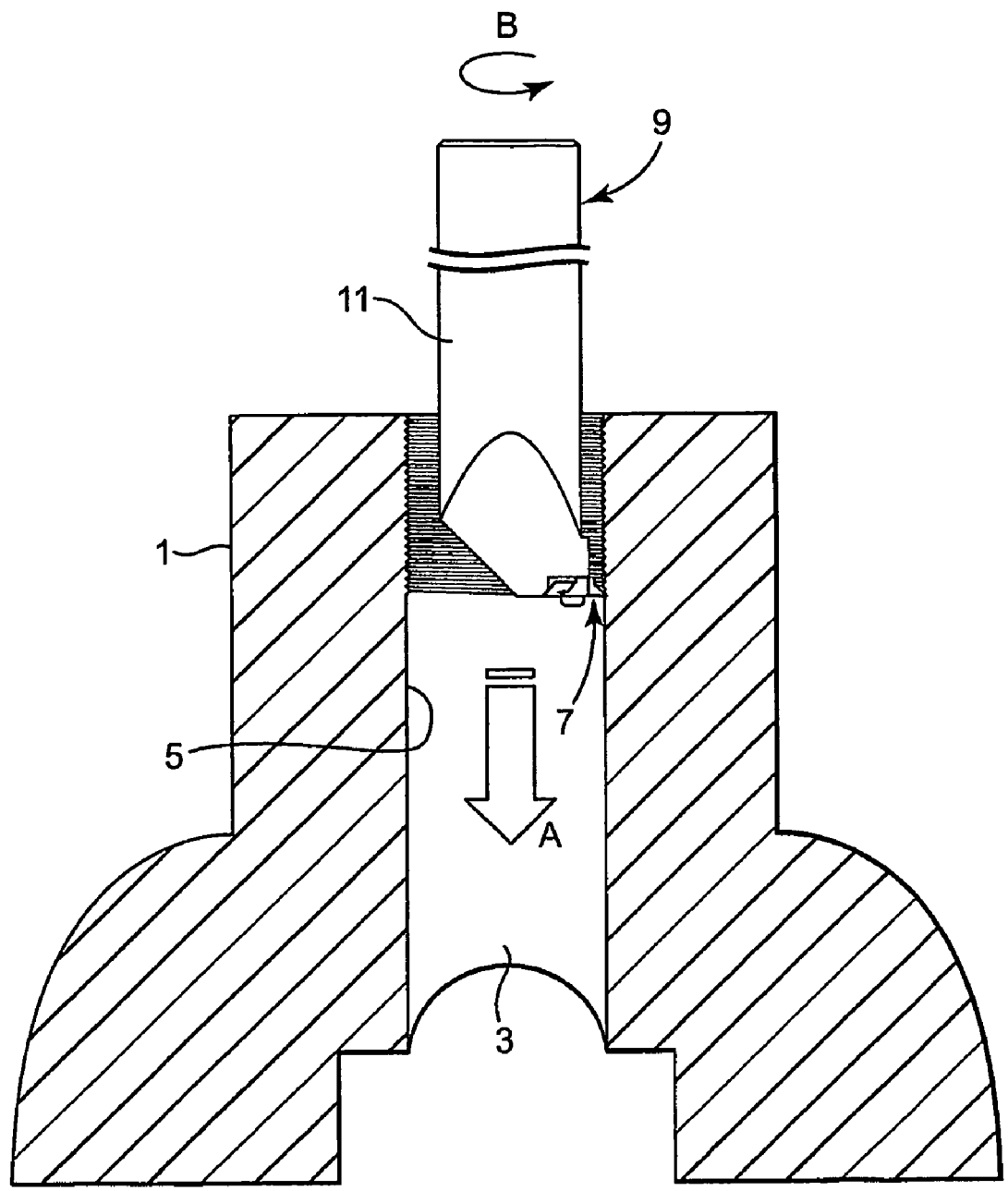
FIG. 1 is a cross-sectional view of a cylinder block showing a surface roughening method according to a first embodiment of the present invention.

The present invention is generally related to a surface roughening method in which a cutting tool is moved along a longitudinal axis of a body. The cutting tool includes a radial cutting head having at least one cutting blade. As the cutting tool rotates about the longitudinal axis of the body, an asymmetrical leading cutting edge of the cutting blade moves relative to the body and cuts on a surface of the body a first machined pattern of peaks and valleys. The valleys have an asymmetric shape when viewed in cross section, and in a preferred embodiment a line drawn along a first wall of the valleys is substantially normal to the surface of the body being machined, and a line drawn along a second wall of the valleys forms an acute angle with respect to the line drawn through the first wall.

The first wall and the second wall also preferably include a concave region. A trailing cutting edge of the cutting blade of the cutting tool applies stress on the peaks in the first pattern, which fractures the peaks to create fractured surfaces and form a second machined pattern in the surface of the body. In the second machined pattern the fractured surfaces are lands separated by grooves, which correspond to the valleys remaining from the first machined pattern. The first wall and the second wall in the second pattern include a notch that corresponds to the concave region in the first pattern.

The surface roughening method according to some embodiments of the present invention may thus lead to more uniformly shaped surface roughness patterns, which increase the adhesion strength and uniformity of a thermal spray coating applied to the roughened surface of, for example, an internal surface of an internal combustion engine cylinder bore. In additional embodiments, the adhesion strength between two articles may also be increased using the surface roughening method to roughen an external peripheral surface of, for example, a cylinder liner cast in a cylinder block.

Therefore, compared with the case where the bisector of the angle made by the slopes of both walls of the valleys is aligned with a line normal to the surface of the body being machined, one of the walls of the valleys can be positioned closer to the direction of the normal line. As a result, a spray coating applied to a roughened surface according to the present method penetrates the valleys, adheres well to the roughened surface, and is thus not easily separated from the roughened surface of the coated article.

The surface roughening method according to some embodiments of the present invention may thus lead to more uniformly shaped surface roughness patterns, which increases the adhesion strength and uniformity of a thermal spray coating applied to the roughened surface. The roughened surface may be used in, for example, an internal surface of a cylinder bore of an internal combustion engine. In additional embodiments, the adhesion strength between two articles may also be increased using the surface roughening method to roughen an external peripheral surface of, for example, a cylinder liner that is to be inserted as a sleeve into a cast cylinder block.

The present disclosure further relates to a surface roughening method wherein a cutting tool is moved along a longitudinal axis of a cylindrical article. As the cutting tool rotates about the longitudinal axis of the body, an asymmetrical leading cutting edge of the cutting blade moves relative to the article and cuts on an internal or external surface of the article a first substantially helical pattern of peaks and valleys. The valleys have an asymmetric shape when viewed in cross section, and in a preferred embodiment a line drawn along a first wall of the valleys is substantially normal to the surface of the body being machined, and a line drawn along a second wall of the valleys forms an acute angle with respect to the line drawn through the first wall. The first and second walls of the valleys also preferably include a concave region.

A trailing cutting edge of the cutting blade of the cutting tool applies stress on the peaks in the first pattern, which fractures the peaks to create fractured surfaces and form a second substantially helical pattern in the surface of the body. In the second pattern the fractured surfaces are lands separated by grooves, which correspond to the valleys remaining from the first machined pattern. The grooves include notches that correspond to the concave regions in the valleys of the first pattern.

Various preferred embodiments of the present invention will now be described with reference to the drawings. By specifying particular steps in the present disclosure, it is not meant to limit the invention to performing those steps in a particular order unless an order is specified. Similarly, listing particular steps in a particular order is not intended to preclude intermediate steps or additional steps, as long as the enumerated steps appear in the order as specified. Certain materials and articles suitable for practicing the present invention are disclosed; however, additional equivalent materials and articles may be substituted in practicing the invention, as known to one skilled in the art. The detailed description of the present invention is not intended to describe every embodiment or each implementation of the present invention. Other embodiments and their equivalents are within the scope of the present invention.

In the particular examples described below and in FIG. 1, the article to be surface roughened is a cylinder bore 3 of an engine block 1 that has a cylindrical body, and a cylinder bore inner surface 5 that is to be roughened. However, the surface 5 to be roughened need not be an inner surface, but may be an outer surface. The article to be roughened using the surface roughening methods according to the present invention is not limited to a cylinder bore part, but may, for example, be a pipe, a cylindrical bearing surface (e.g. a boss within a tie rod or other bearing surface), a transmission, and the like. In addition, the article need not have a cylindrical shape.

The article may be formed using any number of methods; however, die-casting is a presently preferred method. The article may generally be formed from a metal, for example, a nonferrous metal alloy such as an aluminum alloy (e.g. ADC 12 manufactured by Nissan Motors Company, Tokyo, Japan). However, other machinable materials (e.g. rigid plastics and the like), may be used in practicing the invention according to some embodiments.

In one exemplary method of surface roughening illustrated in FIG. 1, the cutting head 7 is attached to a boring bar 9 that is moved along a longitudinal axis of the bore 3 (direction A in FIG. 1). As the boring bar 9 is moved along direction A, the cutting tool body 11 is rotated in a direction B about the longitudinal axis of the bore 3. The axial cutting head 7 then cuts a pattern into a surface 5 of the cylinder bore 3 to roughen the surface 5 and increase the adhesion of a spray coating that is later applied on the surface 5.

Referring to FIGS. 2-6, the cutting head 7 includes a cutting blade 7a with an asymmetrical leading cutting edge that cuts the surface of the cylindrical body into a first substantially helical thread-like pattern including peaks and valleys, and a trailing cutting edge 7c that forms a fracture surface by applying stress on the peaks of the thread pattern, thereby forming a second substantially helical pattern of lands and the grooves on the surface of the cylindrical body, with the grooves corresponding to the valleys of the first pattern.

The cutting head 7 may be fabricated from any number of materials, but generally includes at least one of a metal, a ceramic material, or diamond. The cutting blades 7a generally include at least one metal selected from titanium, tungsten, cobalt, nickel, iron, or aluminum. The cutting blades 7a and in particular, the trailing cutting edge 7c, may include at least one ceramic material selected from one or more of silicon nitride, silicon carbide, aluminum oxide, silicon dioxide, or titanium nitride. Preferably, the cutting blades 7a are harder than the surface of the material to be roughened.

In some embodiments, the disclosure provides a surface roughening system, including a means for roughening a surface (e.g. cutting head 7), further including a leading edge means (e.g. leading cutting edge 7f) for cutting a first pattern of peaks and valleys into the surface, and a trailing edge means (e.g. trailing cutting edge 7c) for fracturing the peaks; a means for feeding (not shown in FIG. 1) the means for roughening in a longitudinal direction relative to the surface (along arrow A in FIG. 1); and a means for rotating (not shown in FIG. 1) the means for roughening in a radial direction relative to the surface (along direction B in FIG. 1). In exemplary embodiments, rotating the means for roughening while feeding the means for roughening relative to the surface creates a roughened surface including a second pattern of plurality of lands and grooves created by fracturing the peaks, each land positioned adjacent to a groove, wherein the grooves correspond to the valleys in the first pattern. The grooves in the second pattern also include a notch corresponding to the concave regions the valley walls of the first pattern.

Figure 2:
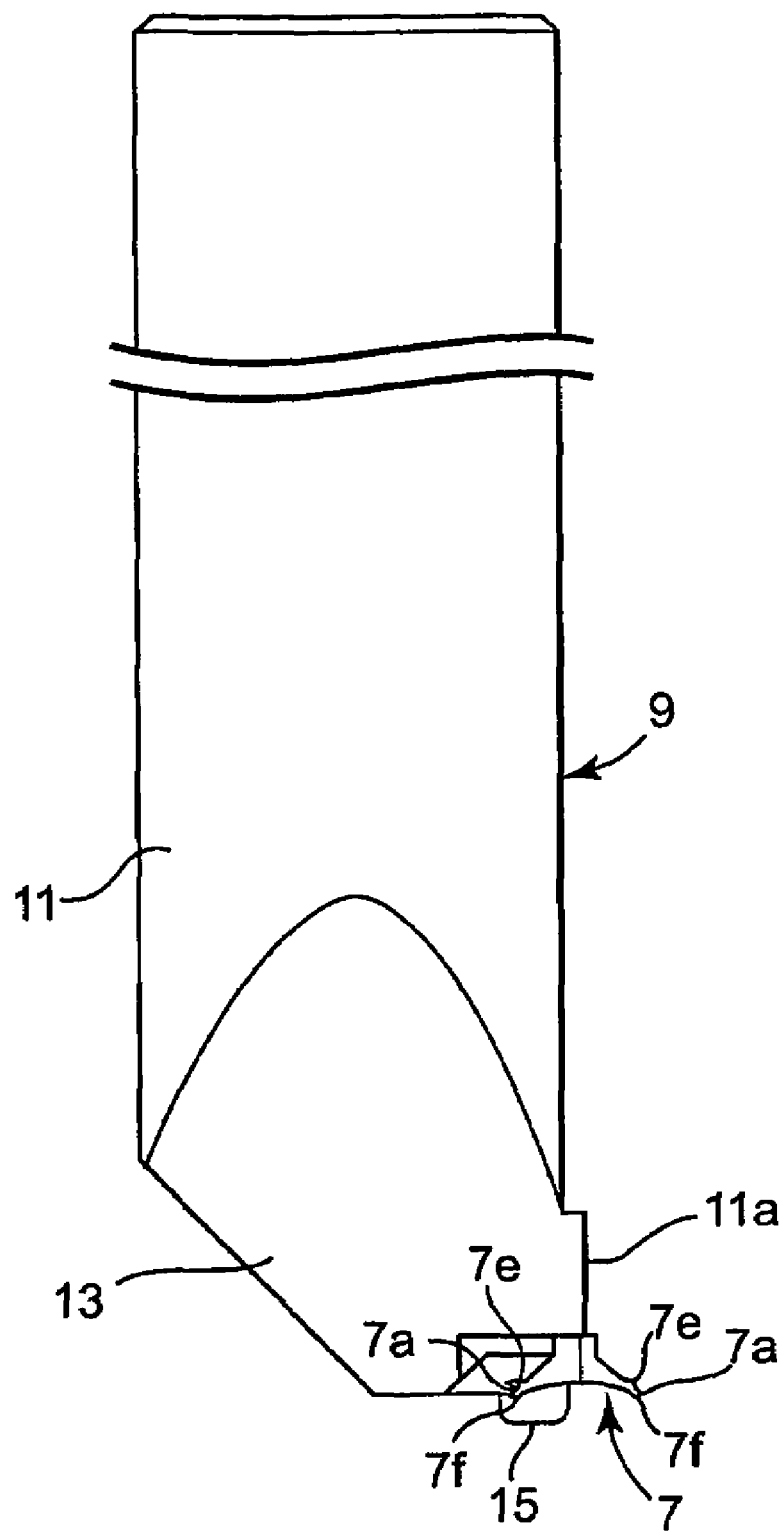
FIG. 2 is a front view of a cutting tool according to another embodiment useful in practicing the surface roughening method of FIG. 1.
Figure 3:
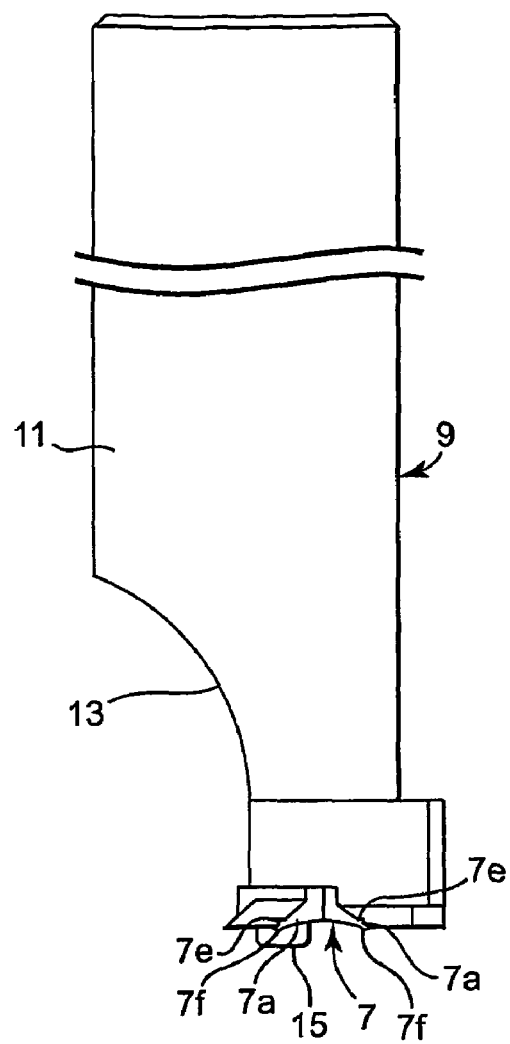
FIG. 3 is a side view the cutting tool of FIG. 2.
Figure 4:
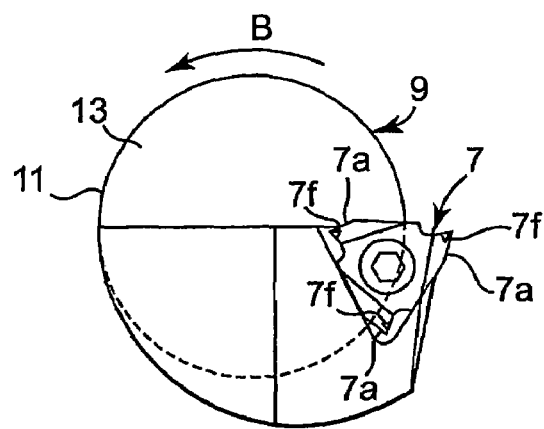
FIG. 4 is a bottom view of the cutting tool of FIG. 2.

When the surface of the above described inner surface 5 of the cylinder bore is roughened, boring bar 9 equipped with cutting head 7, the close-up view of which is shown in FIG. 2, is used. FIG. 3 is a side view of FIG. 2 and FIG. 4 shows a bottom surface of FIG. 2. The boring bar 9 has cut 13 that forms a concave surface in the side surface of the edge of tool body 11, as shown in the lower part of FIG. 2. The cutting head 7 may be bolted with bolt 15 to the edge of the tool body, which is deviated from cut 13.

Figure 5:
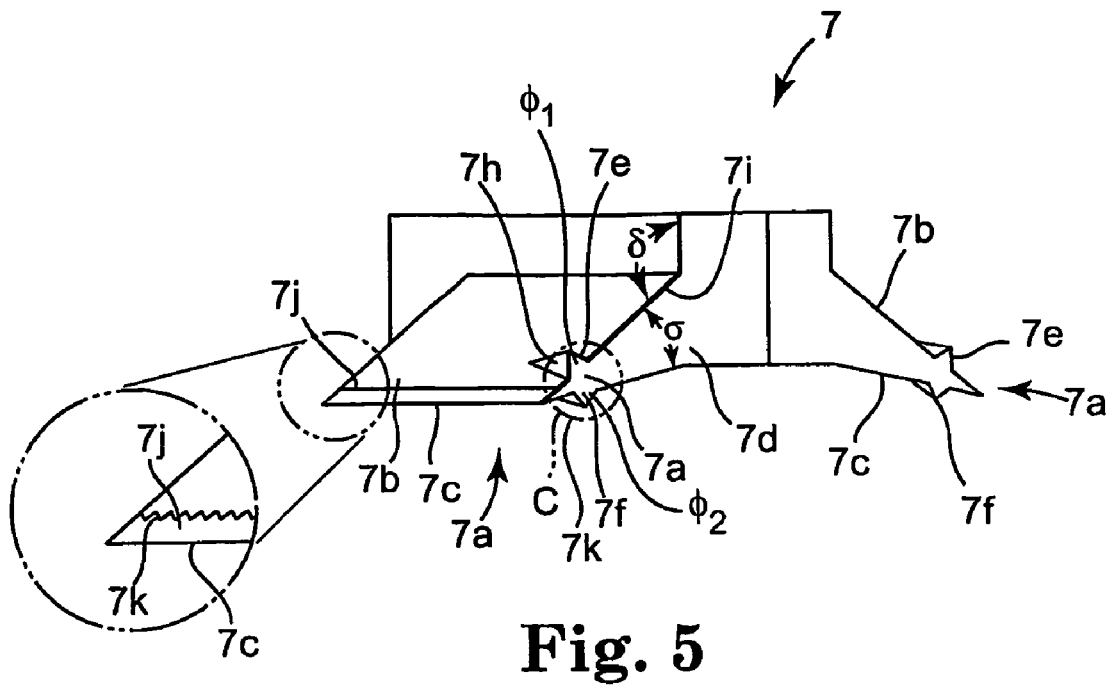
FIG. 5 is a front enlarged view of the cutting head of the cutting tool of FIG. 2.
Figure 6:
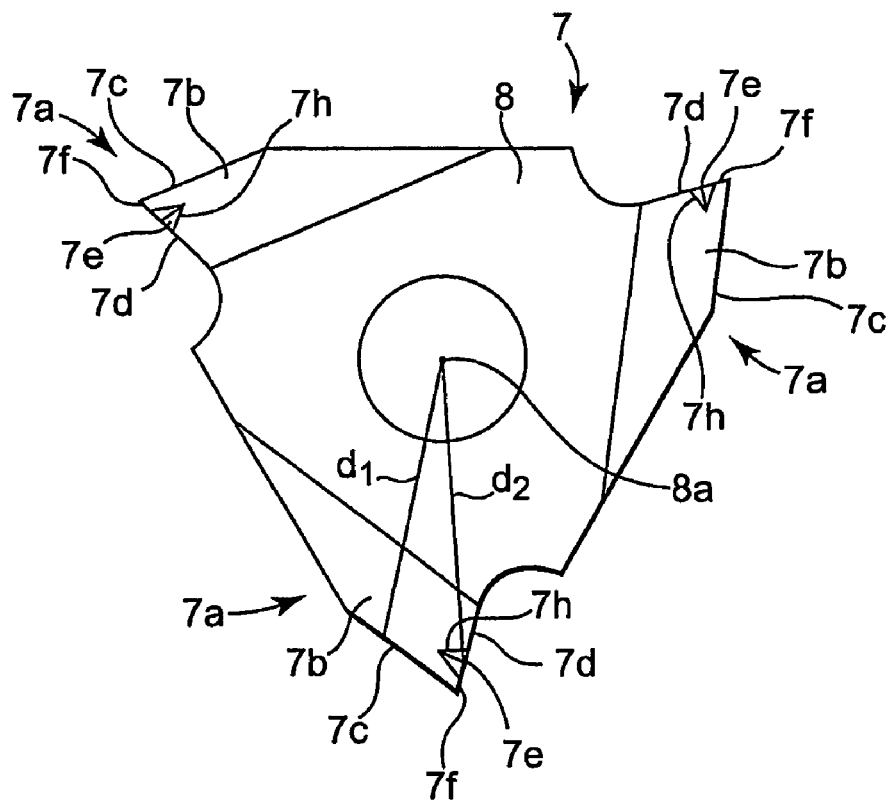
FIG. 6 is an overhead view of the cutting head of FIG. 5.

As shown in FIG. 6, an exemplary cutting head 7 includes three cutting blades 7a extending radially outward from a body 8 of the cutting head at even angular intervals. In certain embodiments, each of the three cutting blades 7a can be removed when worn from cutting, and by attaching them on the tool body 11 again while rotating the cutting head body 8 120 degrees from the state in FIG. 4, another fresh cutting blade 7a can be used. It should be emphasized that the cutting head configuration shown in FIGS. 5-6 is only exemplary, and many different cutting tool shapes may be used, as long as a first cutting edge of the cutting blade makes a pattern of peaks and a second cutting edge fractures the peaks to form fracture surfaces.

Referring to FIGS. 5-6 each cutting blade 7a includes a planar surface 7b oriented at an obtuse angle δ below a plane of the body 8 of the cutting head 7. The planar surface 7b extends a first axial distance $d_1$ from a centerline 8a of the cutting head 7. The intersection of the first planar surface 7b and a first rake surface 7d forms a leading cutting edge 7i. The angle σ is selected to form the angles between the walls of the first machined pattern of peaks and valleys in the surface 5. The cutting blades 7a further include a first truncated pyramidal projection 7h extending upward from the first planar surface 7b. The projection 7h includes a cutting edge 7e that cuts a notch in a second wall of the first pattern of peaks and valleys in the surface 5. The projection 7h is located at an axial distance d2 from the centerline 8a of the cutting head 7, and includes an angle $\phi_1$ selected to form the walls of the notch in the second wall of the first machined pattern. The cutting blades 7a also include a second truncated pyramidal projection 7f extending below the first planar surface 7b. The second projection 7f includes a cutting edge 7k that cuts a notch in the first wall of the first pattern of peaks and valleys in the surface 5. The projection 7f is also located at an axial distance $d_2$ from the centerline 8a of the cutting head 7, and includes an angle $\phi_2$ selected to form the walls of the notch in the first wall of the first machined pattern.

The planar surface 7b slopes upward from its leading cutting edge 7i to meet a trailing cutting edge 7c. The sloped surface 7b and the trailing cutting edge 7c fracture the peaks in the first machined pattern to form fracture surfaces in a second machined pattern, with the fracture surfaces being separated by grooves corresponding to the valleys from the first machined pattern. As shown in FIG. 5, in cutting blade 7a, the leading cutting edge 7i formed by the intersection of the first planar surface 7b and the first rake surface 7d is lower than the trailing cutting edge 7c.

In certain embodiments, the trailing cutting edge 7c of the cutting blade 7a may also include irregular projections and depressions that roughen the surface after or at the same time as the trailing cutting edge 7c removes the peaks in the first machined pattern. The irregular projections and depressions remove the peaks and form fracture surfaces having increased surface area. In some embodiments, the trailing cutting edge 7c may be fitted with an end face 7j that produces a roughened fracture surface.

FIG. 5, feature A shows an expanded view of an exemplary cutting head 7 having an end face 7j useful in practicing this presently preferred embodiment. In this example, an irregularly shaped part 7k is provided on the end face 7j in the projecting part 7c of the cutting head 7. The irregularly shaped part 7k has projections and recessions that make the irregularly shaped fracture surface having projections and recessions, by contacting the fracture surface during or shortly after removal of the peak. The end face 7j may include an irregular shaped edge 7k (e.g. a serrated edge as shown in FIG. 5 view A) or the shaped edge 7k may gradually taper along the trailing cutting edge 7c from a wide edge at the leading cutting edge 7i to a narrower edge distal from the leading cutting edge 7i (not shown in FIG. 5). A tapered shaped edge 7k may produce a roughened fracture surface by applying a non-uniform stress to the peaks in the first machined pattern. Since the surface texture of the roughened surface may thus be made finer, the fracture surface may exhibit a higher surface area, and the adhesion strength of the thermal spray coating may be increased.

Figure 7:
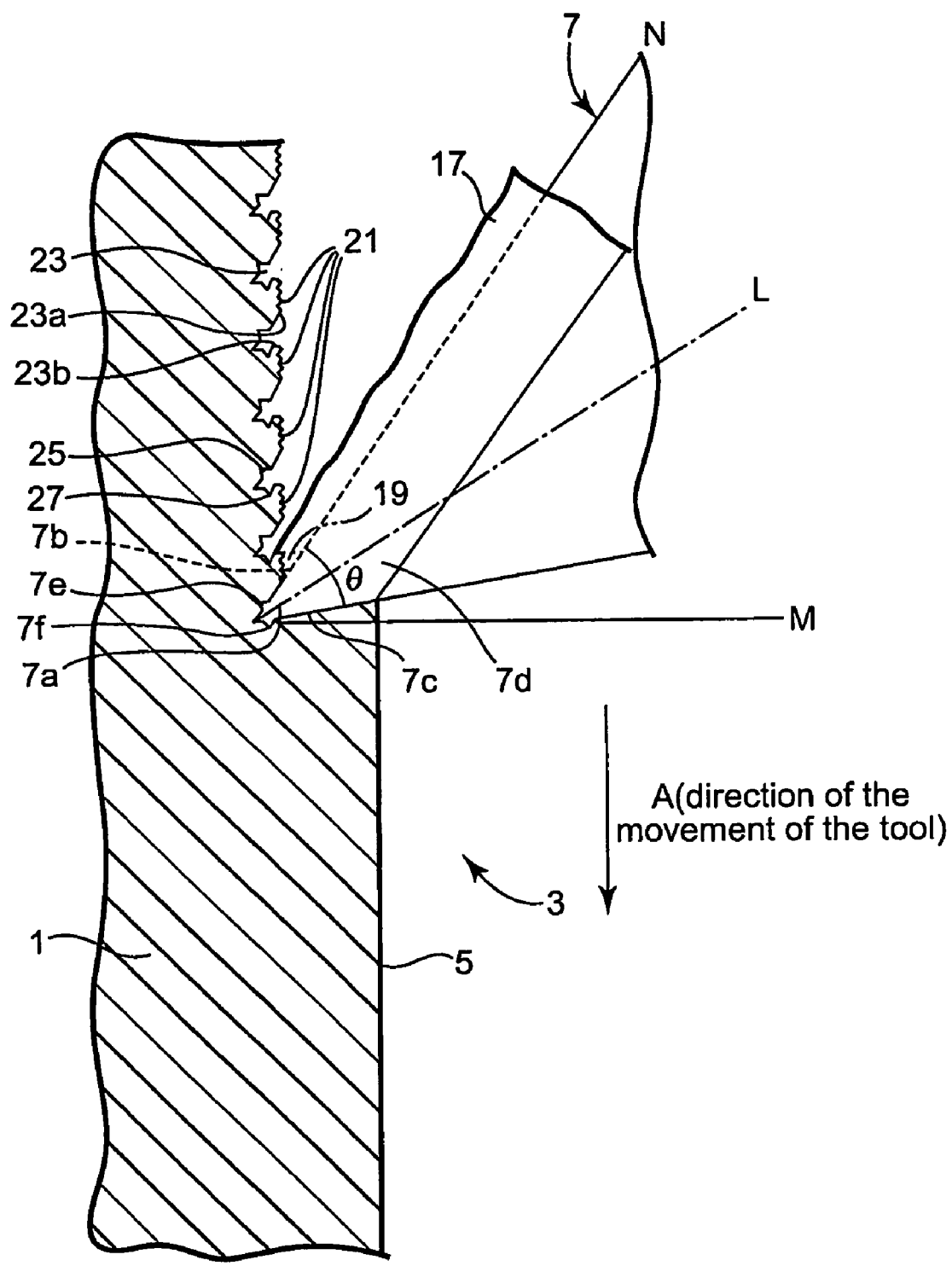
FIG. 7 is an enlarged cross-sectional view of part C of FIG. 5 showing a cutting method with the cutting blade that is part of the cutting head of FIG. 5.

FIG. 7 is a cross-sectional view illustrating a cutting operation performed by the cutting tooth 7a, which is a close-up view of part C of FIG. 5. In FIG. 7, as cutting head 7 moves from the underside of the paper upward and out of the plane of the paper toward the viewer, it generates shavings 17. During the above described cutting operation, the leading cutting edge 7i cuts a first machined pattern including peaks 19 and corresponding valleys 23 in the surface 5 of the bore 3. The valleys include a first wall 23a and a second wall 23b. The cutting edge 7e in the first protrusion 7h adjacent to the leading cutting edge 7i creates a first concave region or notch 25 in the wall 23b. At the same time, the cutting edge 7k on the protrusion 7f creates a second concave region or notch 27 in the wall 23a. The sloped surface of the planar region 7b and the trailing cutting edge 7c and shavings 17 generated from the cutting operation remove at least portions of the peaks 19 in the first machined pattern to create fracture surfaces 21 between the valleys 23.

In this case, the trailing cutting edge 7c of the cutting blade 7a applies stress on one part of peaks 19 (bottom side in FIG. 7), across the peak 19 (vertical direction in FIG. 7) to form a starting point for fracturing the peak 17. By forming such a starting point for fracturing the peak 17, the peak 17 may be easily fractured by the trailing cutting edge 7c, and the shape of the fracture surface 19 is more uniform and symmetrical. In addition, since the peak 17 is easily fractured using the trailing cutting edge 7c, the cutting stress applied on the blade 7a is reduced and so may also extend the life of the cutting head 7. Preferably, the entire cross section of each peak in the longitudinal direction is fractured by applying the cutting stress to each peak in a non-axial direction. In some embodiments, the shape of each groove is asymmetrical. In exemplary embodiments, each groove defines a notched v-shape as shown in FIGS. 7-9 and FIG. 11.

With cutting blade 7a described above, the cutting operation is preferably performed so that a line M drawn along the wall 23a is substantially normal to the surface 5 being machined, and a line N drawn along a second wall 23b forms an acute angle θ with respect to the line M drawn along the first wall. A bisector L of the angle θ also forms an acute angle with respect to the line M, in contrast to a conventional symmetrical v-groove cut in which the bisector is typically substantially aligned with the line M.

In other words, with cutting blade 7a, the cutting operation is performed so that the shape of the walls 23a, 23b located on both sides of the valleys 23 between peaks 19 in the first pattern is asymmetrical to the direction of normal line M. Instead of a substantially horizontal trailing cutting edge 7c forming an acute angle θ between the walls 23a, 23b as shown in FIG. 7, the cutting blade 7a may have a more sharply angled surface 7cs that forms a more acute angle $\theta_1$ between walls 23a and 23b (FIG. 8), or a less sharply angled surface 7ct that forms a less acute angle $\theta_2$ between the walls 23a and 23b (FIG. 9).

Figure 9:
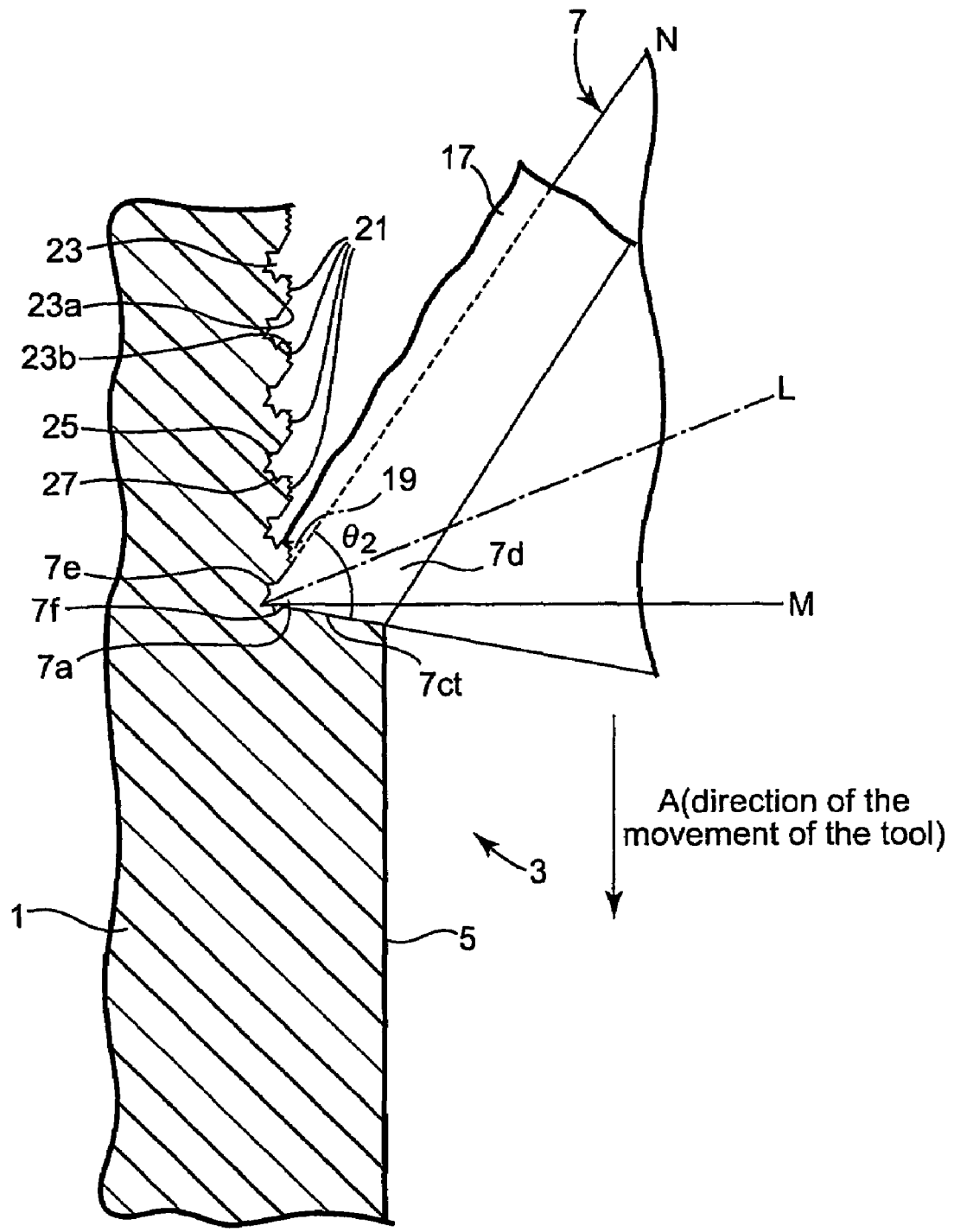
FIG. 9 is an enlarged cross-sectional view of a cutting method illustrating another embodiment of a cutting head and cutting tool.
Figure 10:
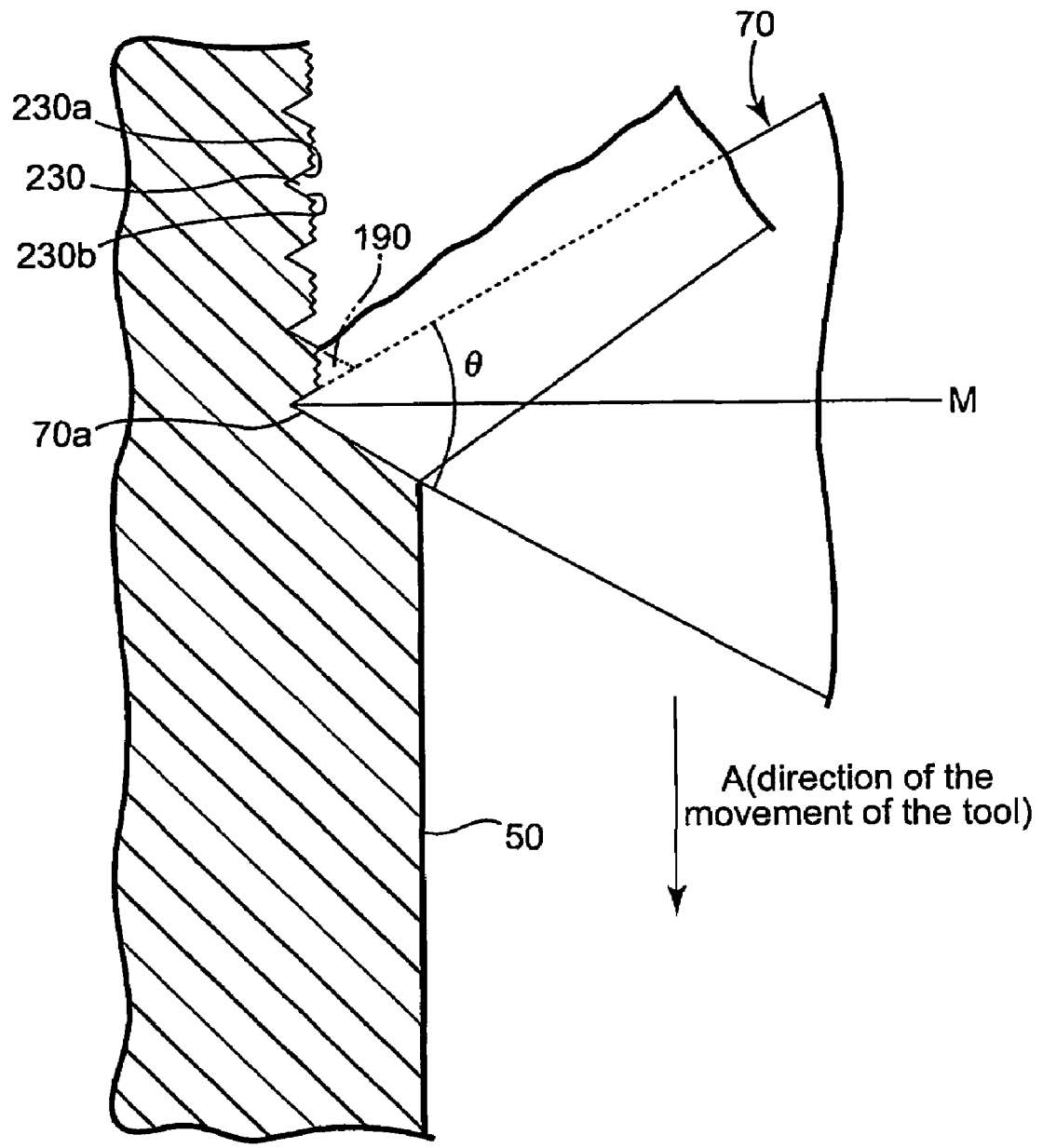
FIG. 10 is an enlarged cross-sectional view illustrating a cutting method using a conventional cutting head and cutting blade.

Thus, compared with the case in which the shape of valleys 23 are symmetrical v-grooves as shown in the comparative example of FIG. 10, that is, angle $\theta$ made by a cutting blade 70a to form walls 230a, 230b of both sides of valleys 230 is symmetrical and aligned with the direction of normal line M of inner surface 50 of the cylinder bore, one side of walls 23a, 23b of valleys 23 of the present embodiment (the lower part in FIGS. 7-9) can be moved closer to the direction of normal line M. This makes the grooves asymmetrical with respect to M. When the fracture surface 21 is created, the surface roughening process is complete.

Once the cylinder bore inner surface 5 is roughened by means of the method described herein, a coating material may be applied to the roughened cylinder bore inner surface 5 to form a coating. In some embodiments, the coating is applied using at least one of chemical vapor deposition, plasma deposition, thermal spray coating, and fluid spray coating. Preferably, the coating is applied using thermal spray coating. The coating may include an abrasion resistant material. In some embodiments, the coating includes a ceramic material or a metal. Preferably, the thermal spray coating material includes a ferrous metal.

As a result, the part of the spray coating created in the surface roughened part that penetrates valleys 23 is not easily separated. During the engine combustion process, when fuel pressure is applied to a piston, which is not shown in the drawings, the piston moves downward and rubs against inner surface 5 of the cylinder bore. This force tries to separate the spray coating created in inner surface 5 of the cylinder bore.

Figure 8:
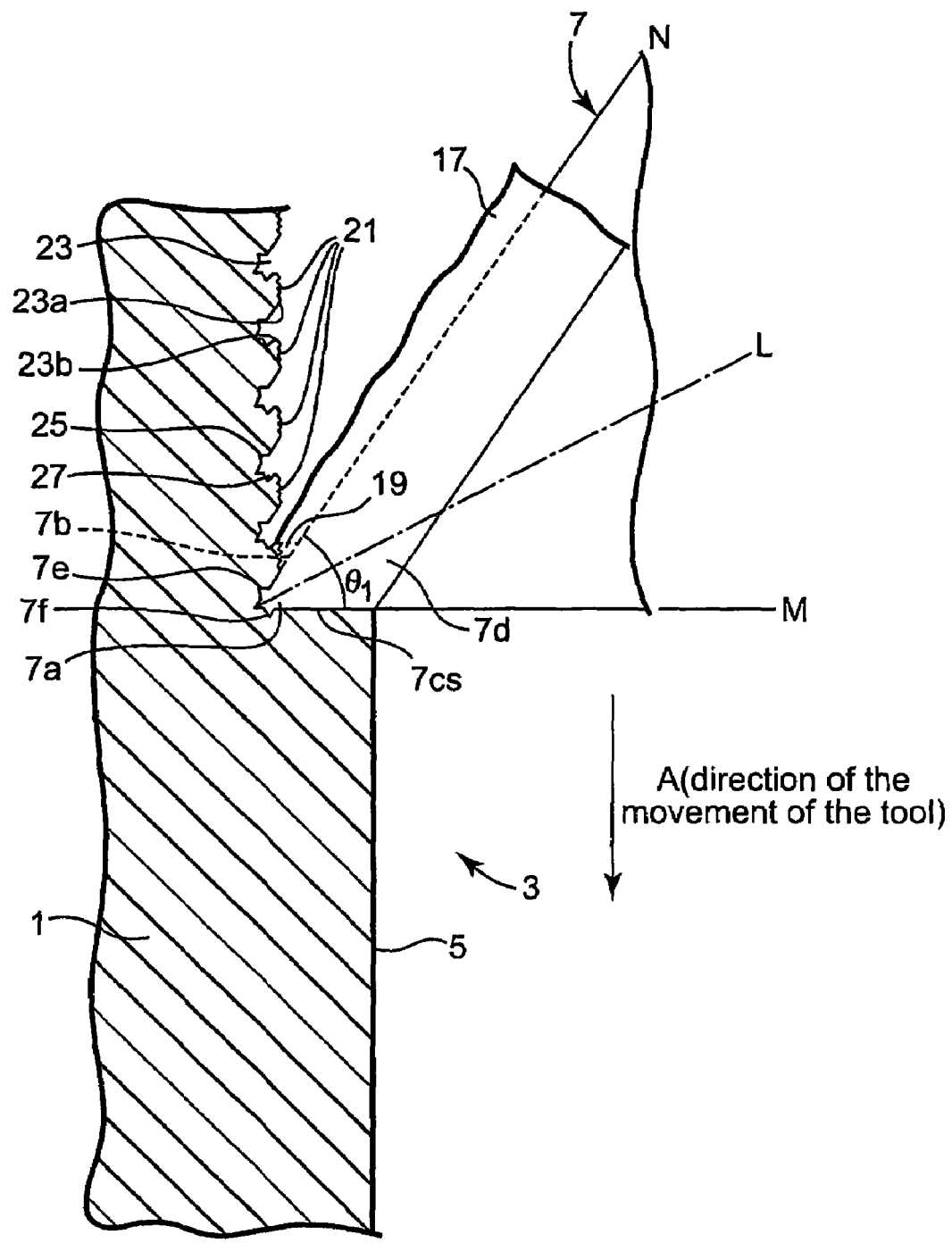
FIG. 8 is an enlarged cross-sectional view of a cutting method illustrating another embodiment of a cutting head and cutting tool.

According to the present embodiment, the above described one wall 23a of valleys 23, which is located on the lower part in FIGS. 7-9, is located on the bottom dead center of the piston to the other side of slopes 23a located on the upper side. Since this other side of the wall 23a is closer to normal line M of inner surface 5 of the cylinder bore, even if the force tries to separate the spray coating when the piston moves downward rubbing against inner surface 5 of the cylinder, it is possible to prevent the separation of the spray coating. As shown in FIG. 7, this is especially effective in the case where a line along one wall 23a located on the front side of the tool body to which the tool moves is aligned with the normal line M.

Furthermore, as shown in FIG. 7, since concave regions or notches 25, 27 are created in the wall 23b of valleys 23 by protrusions 7e and 7f projection from the sloped planar surface 7b of cutting blade 7a, the spray coating penetrates these concave regions and increases the adhesion of the coating to the inner surface 5 of the cylinder bore. Here, when the inner surface 5 of the cylinder bore is cut, boring bar 9 may be fixed so that cylinder block 1 is moved and rotated in an axial direction.

Figure 11:
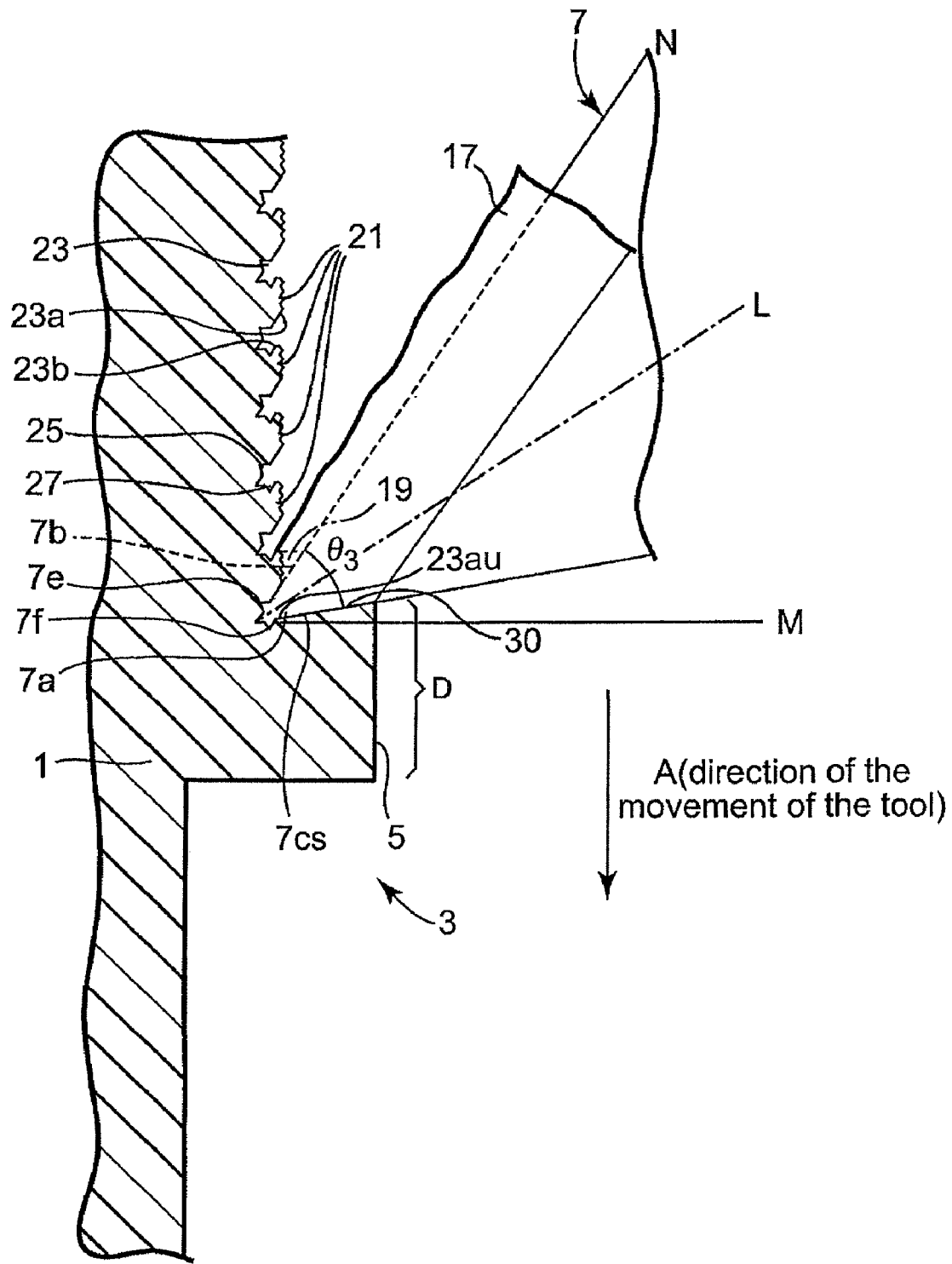
FIG. 11 is a cross-sectional view illustrating a cutting method using a cutting head with a cutting blade that includes an irregularly shaped fracture surface and additionally showing an uncut part of the inner surface of the cylinder bore.

Moreover, as shown in FIG. 8, when horizontal surface 7c is replaced with lower slope surface 7cs so that angle $\theta_3$ of cutting tooth 7a becomes sharper, as shown in FIG. 11, the cutting operation is not performed on the entire longitudinal length of inner surface 5 of the cylinder bore, but an uncut region D is left in the lower edge region of the machined inner surface 5. As a result, because of uncut region D, a base region 30 in the lowest edge region of the machined surface 5 does not open in the lower edge part of inner surface 5 of the cylinder bore and stays closed. Moreover, slope 23au located on the lower part of the base region 30, has an upward slope.

Therefore, the spray coating penetrating this base region 30 is extremely difficult to separate from the roughened surface 5, which increases the adhesion of the entire spray coating to inner surface 5 of the cylinder bore.

Figure 12:
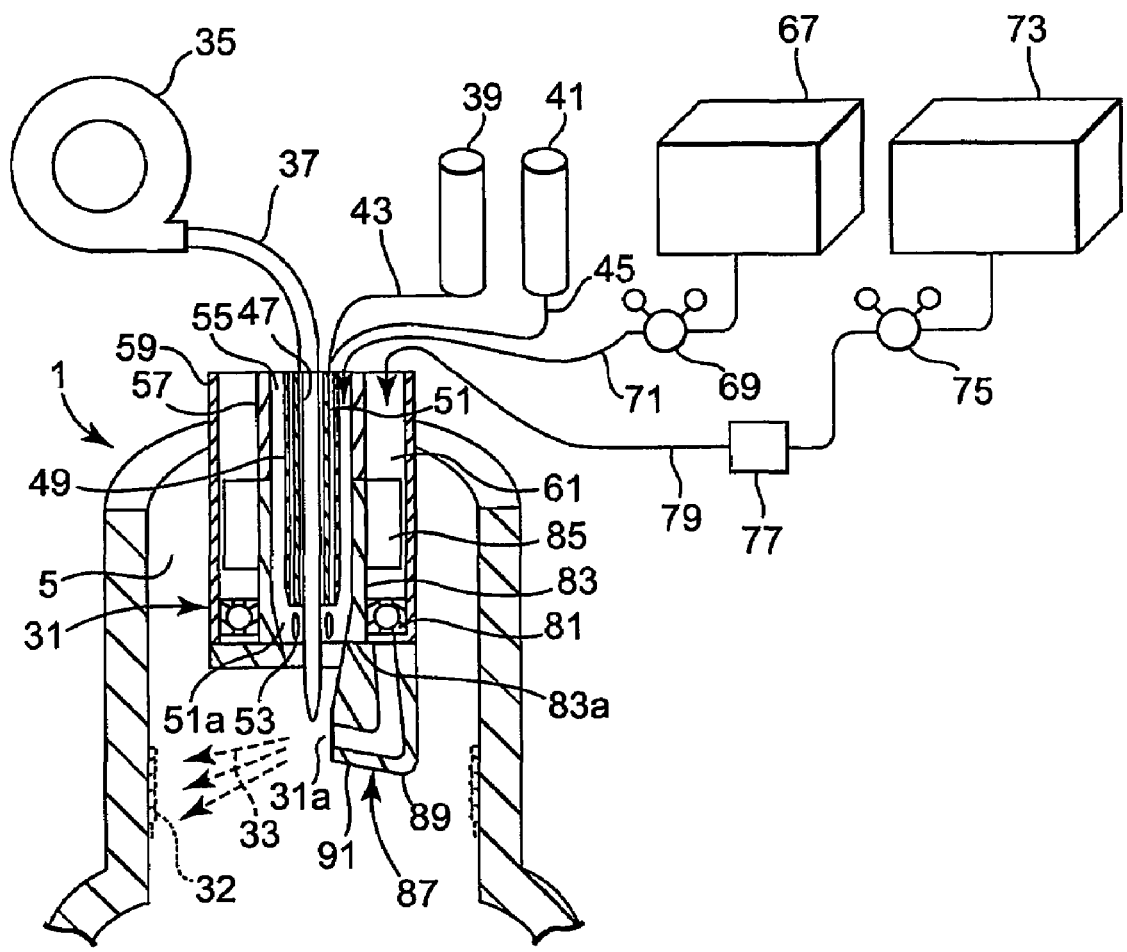
FIG. 12 is a block diagram showing an outline of exemplary thermal spraying equipment useful in forming a thermal spray coating on a cylinder bore inner surface that is roughened according to another embodiment of the present invention.

FIG. 12 is a block diagram showing a schematic of exemplary thermal spraying equipment useful in forming a roughened surface on a cylinder bore inner surface according to another embodiment of the present invention. FIG. 12 illustrates the thermal spraying equipment that may be used to form a thermal spray coating after roughening the surface on the cylinder bore inner surface 5 of the cylinder block 1. This exemplary thermal spraying equipment inserts a gas wire thermal spraying gun 31 into the center of a cylinder bore, and a fused ferrous metallic material of a thermal spraying material is sprayed in the form of droplets 33 from a thermal spraying port 31a to form a thermal spray coating 32 on the cylinder bore inner surface 5.

The thermal spraying gun 31 may be fed a supply of melting wire 37 of a ferrous metallic material as the material for thermal spraying from a melting wire feeding machine 35, and further may receive a supply of a fuel gas and oxygen from a fuel gas cylinder 39 which stores fuel such as acetylene, propane, ethylene, and the like; and from an oxygen cylinder 41 which stores oxygen and delivers oxygen gas, through piping 43 and 45 respectively. The melting wire 37 may be fed to the thermal spraying gun 31 from the upper end to the lower side of a melting wire feed hole 47 that vertically penetrates the central part of the gun. In addition, the fuel and oxygen may be supplied to a gas guide channel 51 that is formed by vertically penetrating a cylindrical part 49 located on the outside of the melting wire feed hole 47. This mixed gas supply of fuel and oxygen may flow out from a lower end opening 51a of the gas guide channel 51 in FIG. 12 and when ignited, forms a combustion flame 53.

An atomized-air channel 55 may be provided on the outer circumference of the cylindrical body 49, and an accelerated-air channel 61 formed between a cylindrical bulkhead 57 and a cylindrical external wall 59 is provided outside of the atomized-air channel. Atomized-air flowing through the atomized-air channel 55, may be pre-heated by the combustion flame 53, and fed forward (downward in FIG. 12) in order to allow the perimeter part to cool. Atomized-air may also be fed forward to the fused melting wire 37. At or about the same time, accelerated-air flowing through the accelerated-air channel 61 is also fed forward, and feeds the melted melting wire 37 to the cylinder bore inner surface 3 as droplets 33 so that it intersects with the feed direction to form the sprayed coating 32 on the cylinder bore inner surface 5.

Atomized-air may be supplied to the atomized-air channel 55 from an atomized-air supply source 67 through an air supply pipe 71 with a pressure regulator 69. At or about the same time, accelerated-air is supplied to the accelerated-air channel 61 from an accelerated-air supply source 73 through an air supply pipe 79 with a pressure regulator 75 and a micromist filter 77. The bulkhead 57 between the atomized-air channel 55 and the accelerated-air channel 61 includes of a rotary cylinder part 83 which can be rotated through a bearing 81 of the external wall 59 at the tip of the lower side in FIG. 12. A rotary wing 85 that is located in the accelerated-air channel 61 is provided on the upper outer circumference of this rotary cylinder part 83. When accelerated-air flowing through the accelerated-air channel 61 works on the rotary wing 85, the rotary cylinder part 83 rotates.

A tip part 87 that rotates integrally with the rotary cylinder part 83 may be fixed on the tip (lower end) 83a of the rotary cylinder part 83. A projecting part 91 with a spout channel 89 that communicates with the accelerated-air channel 61 through the bearing 81 is provided on one part of the peripheral edge of the tip part 87, and the thermal spraying port 31a which spouts out droplets 33 is provided at the tip of the spout channel 89. By rotating the tip part 87 with the thermal spraying port 31a integrally with the rotary cylinder part 83, while moving the thermal spraying gun 31 in the axial direction of the cylinder bore, a sprayed coating 32 is formed on almost the entire area of the cylinder bore inner surface 5.

Although in each of the embodiments explained above, surface roughening is performed at the internal surface of cylindrical bodies such as with the cylinder bore inner surface 5, another embodiment explained below illustrates increasing the bonding strength of a cylinder liner 103 with a cylinder block 101 by roughening the outer peripheral surface 103a of the cylinder liner 103, that is the outer surface of a cylindrical body, by means of a similar method to the cylinder bore inner surface 5 in each of the embodiments described above. This embodiment may be particularly useful when the cylinder liner 103 is made of, for example, cast iron, and the cylindrical body is cast into a cylinder block 101 that is made of, for example, an aluminum alloy, as shown in FIG. 13.

Figure 13:
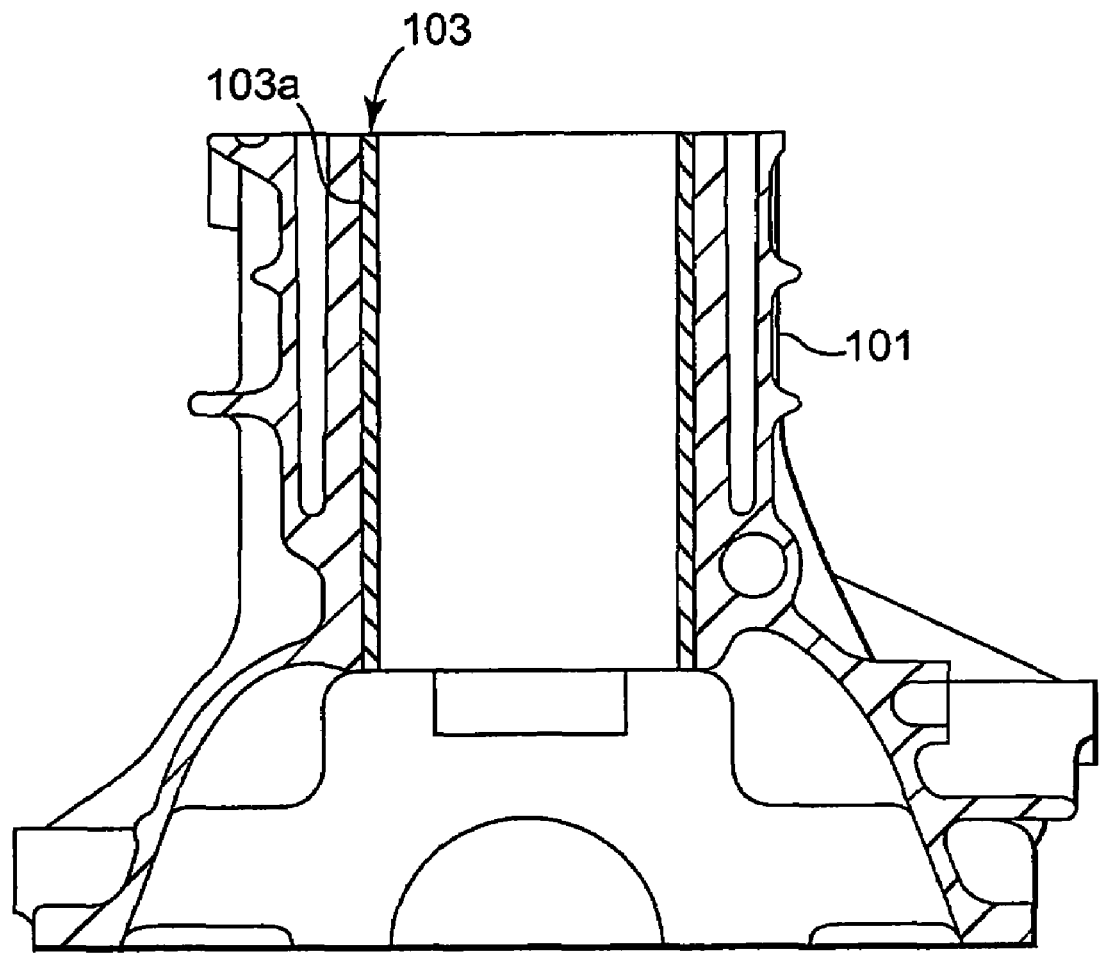
FIG. 13 is a cross-sectional view of a surface roughened cylinder block (e.g. made of an aluminum alloy) for an internal combustion engine in which a cylinder liner (e.g. made of cast iron) is integrally molded according to another embodiment of the present invention.
Figure 14A:
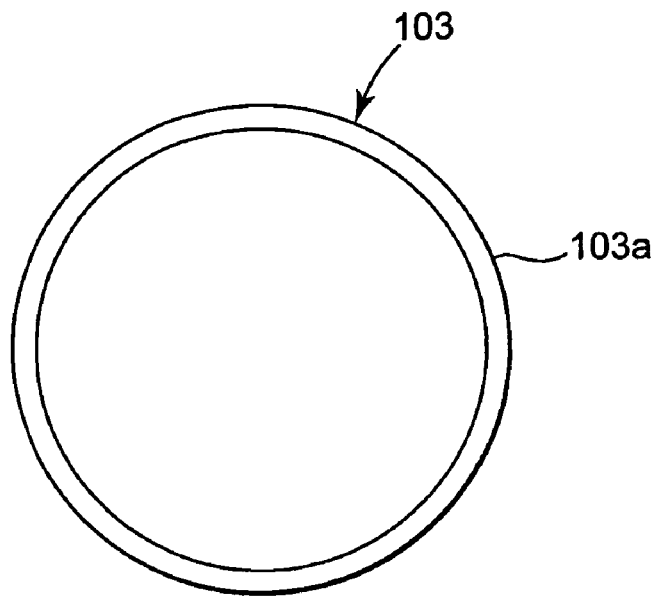
FIG. 14A is a top view of the cylinder liner in FIG. 13.
Figure 14B:
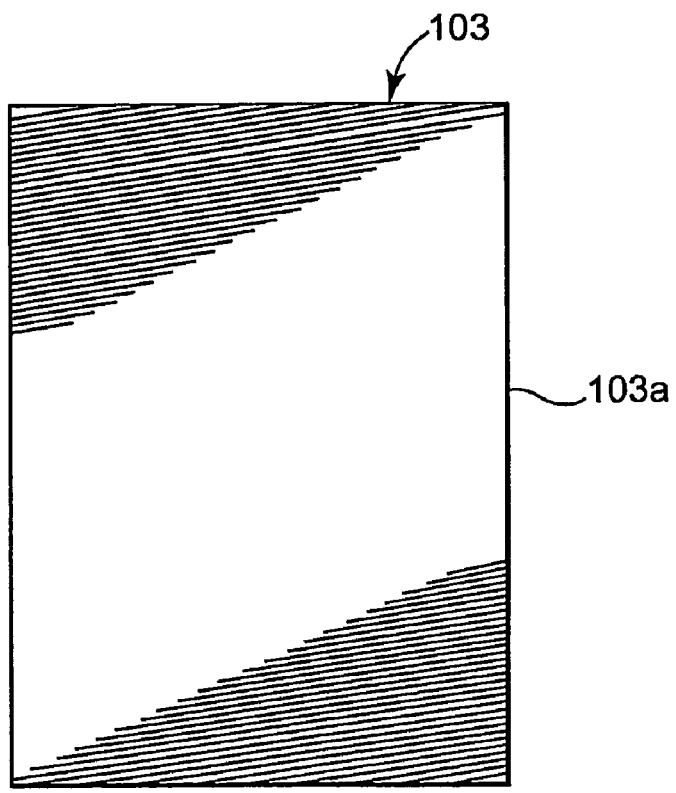
FIG. 14B is a plane view of FIG. 14A showing the roughened exterior peripheral surface of the cylinder liner of FIG. 13.

FIG. 14A is a top view of the cylinder liner in FIG. 13, and FIG. 14B is a plane view of FIG. 14A showing the roughened exterior peripheral surface of the cylinder liner of FIG. 13. Outer circumferential surface 103a of cylinder liner 103 is cut in a screw shape by using cutting tooth 7a of boring bar 9 equipped with cutting head 7 shown in FIGS. 5 and 6. At the same time, peaks 19 which are generated by the cutting operation as shown in FIG. 7, are fractured by cutting tooth 7a or shavings thereby creating fracture surface 21 as shown in FIG. 7. As a result, it is possible to obtain cylinder liner 103 with roughened outer circumferential surface 103a as shown in FIG. 14(a).

Figure 15:
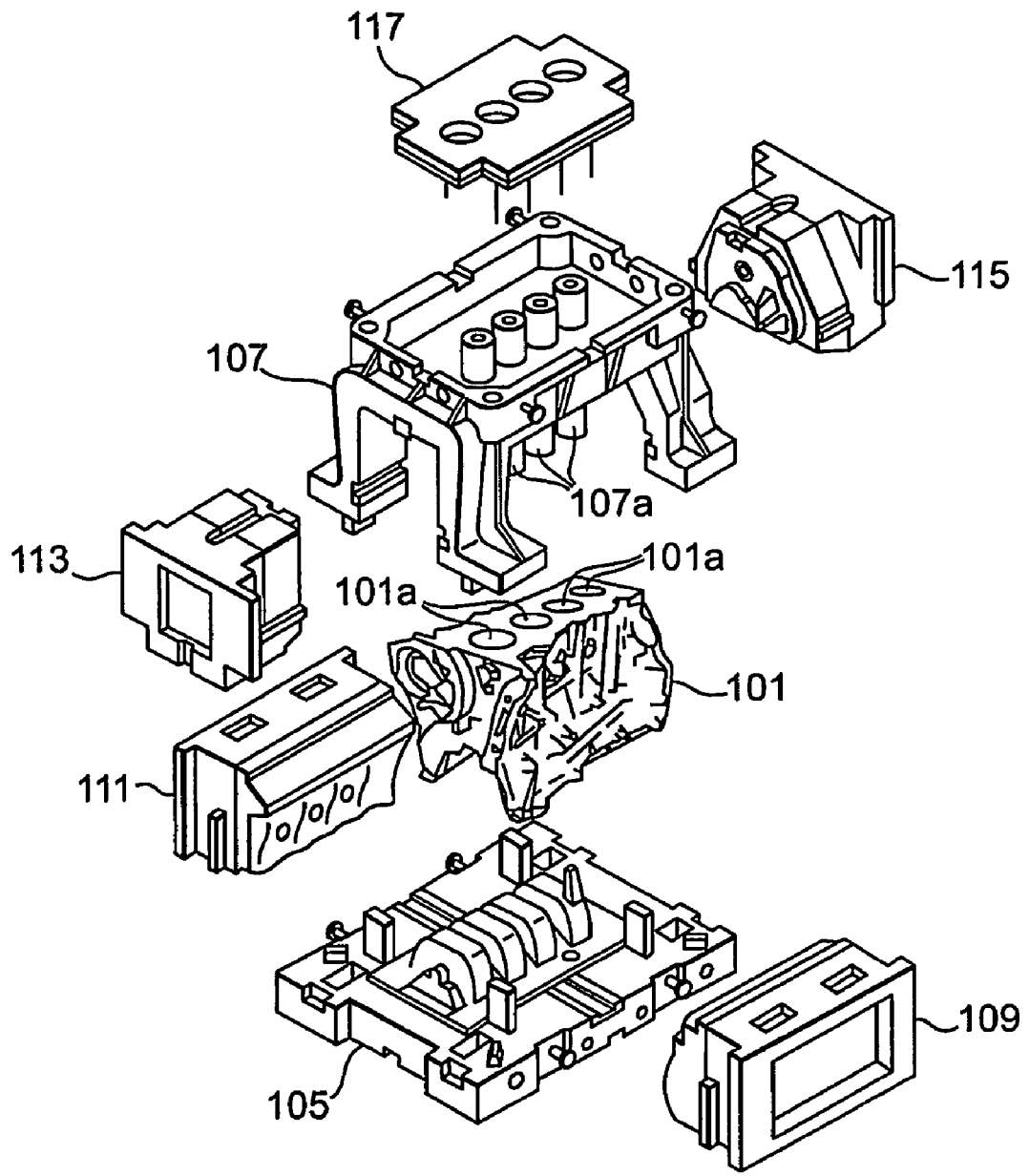
FIG. 15 is an exploded perspective view of exemplary casting molds used to cast and form a cylinder block for an internal combustion engine as shown in FIG. 13.

Cylinder liner 103 with roughened outer circumferential surface 103a is cast and molded when cylinder block 101 is cast and molded in a metal mold for casting shown in FIG. 15. The metal mold for casting has bottom die 105, upper die 107, right and left side die 109 and 111, front and back die 113 and 115 and ejector plate 117 that is placed on the upper part of upper die 107. Bore core 107a which is used for molding cylinder bore 101a of cylinder block 101, is placed in the side opposed to bottom die 105 of upper die 107. Cylinder block 101 is cast and molded while cylinder liner 103 shown in FIG. 14 is supported by bore core 107a.

As a result, as shown in FIG. 13, it is possible to obtain cylinder block 101 cast with cylinder liner 103. Since the surface of the cylinder liner 103 is roughened in the same manner as inner surface 5 of the cylinder bore described above, it is possible to increase the adhesion of cylinder liner 103 to cylinder block 101 thereby obtaining high-quality cylinder block 101.

Various embodiments of the invention have been described. These and other embodiments are within the scope of the following claims.

The invention claimed is:

1. A surface roughening method, comprising:
moving a cutting tool along a longitudinal axis of an article, wherein the cutting tool comprises a radial cutting head, and wherein the radial cutting head comprises a cutting blade with a leading edge and a trailing edge;
rotating the cutting tool about the longitudinal axis such that the leading edge of the cutting blade forms a first pattern of peaks and valleys on a surface of the article, wherein the valleys have first and second walls, and wherein the first and second walls further comprise concave regions; and
applying stress to the peaks in the first pattern with the trailing edge of the cutting blade to create fracture surfaces and form a second pattern, wherein the second pattern comprises lands at the fracture surfaces separated by grooves, wherein the grooves in the second pattern correspond to the valleys in the first pattern.

2. The method of claim 1, wherein
a first line drawn along a first wall of the grooves in the second pattern, and a second line drawn along a second wall of the grooves in the second pattern form an acute angle, and wherein a bisector of the acute angle lies above a line drawn normal to the surface of the article.

3. The method of claim 1, wherein
an entire cross section of each peak along the longitudinal axis of the article is fractured by applying the stress to each peak in a non-axial direction.

4. The method of claim 1, wherein
each of the grooves in the second pattern is asymmetrical.

5. The method of claim 1, wherein
the trailing edge of the cutting head further roughens each of the fracture surfaces to form roughened lands in the second pattern.

6. The method of claim 1, wherein
the article defines a cylindrical body.

7. The method of claim 6, wherein
the cylindrical body comprises an interior surface of the article.

8. The method of claim 1, wherein
the first pattern comprises a substantially helical pattern of peaks and valleys, and wherein the second pattern comprises a substantially helical pattern of lands and grooves.

9. The method of claim 1, wherein
the article comprises a nonferrous metal.

10. The method of claim 1, further comprising
applying a coating overlaying the first and second patterns on the surface of the article.

11. The method of claim 10, wherein
applying the coating comprises at least one of chemical vapor deposition, plasma deposition, thermal spray coating, or fluid spray coating.

12. The method of claim 10, wherein
the coating comprises an abrasion resistant material.

13. The method of claim 10, wherein
the coating comprises at least one of a ceramic material or a ferrous metal.

14. The method of claim 13, wherein
the ceramic material comprises one or more of silicon nitride, silicon carbide, aluminum oxide, silicon dioxide, and titanium nitride.

15. The method of claim 13, wherein
the ferrous metal comprises one or more of titanium, tungsten, cobalt, nickel, iron, and aluminum.

16. A surface roughening method comprising:
moving a cutting tool along a longitudinal axis of an article, the cutting tool comprising a radial cutting head, and the radial cutting head comprising a cutting blade with a leading edge and a trailing edge;
rotating the cutting tool about the longitudinal axis such that the leading edge of the cutting blade forms a first pattern of peaks and valleys on a surface of the article, the valleys having first and second walls, the first wall comprising a first concave region and the second wall comprising a second concave region; and
applying stress to the peaks in the first pattern with the trailing edge of the cutting blade to create fracture surfaces and form a second pattern, the second pattern comprising lands at the fracture surfaces separated by grooves, the grooves in the second pattern corresponding to the valleys in the first pattern, the leading edge of the cutting blade further comprising a second cutting edge and a third cutting edge, the second cutting edge forming the second concave region of the valleys in the first pattern, and the third cutting edge forming the first concave region of the valleys in the first pattern, the first and second concave regions corresponding to notches in the walls of the grooves in the second pattern.

* * * * *